Figure 1:
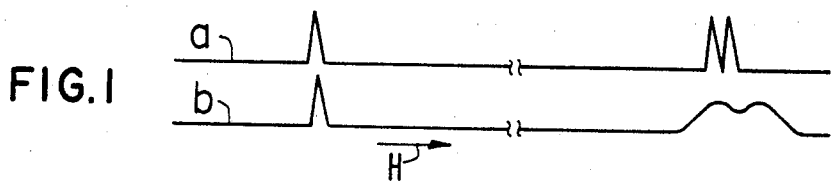

Oct. 15, 1968    F. A. NELSON    3,406,333
SCANNED INTENSITY MAGNET HAVING FIELD HOMOGENEITY
CORRECTION COILS IN COMMON WITH
ITS SCANNING COILS
Filed April 7, 1966

INVENTOR.
FORREST A. NELSON
BY
ATTORNEY

United States Patent Office 3,406,333
Patented Oct. 15, 1968

3,406,333
SCANNED INTENSITY MAGNET HAVING FIELD HOMOGENEITY CORRECTION COILS IN COMMON WITH ITS SCANNING COILS
Forrest A. Nelson, Palo Alto, Calif., assignor to Varian Associates, Palo Alto, Calif., a corporation of California
Filed Apr. 7, 1966, Ser. No. 541,010
5 Claims. (Cl. 324—.5)

The present invention relates in general to scanned homogeneous magnetic fields and, more particularly, to improved field scanning coil systems using the main magnet's field correction coils to provide a field correction for the scanning coils. Such improved field scanning coils circuits are especially useful for, but not limited to, providing relatively wide dynamic range magnetic field scans for very high frequency nuclear magnetic resonance spectrometers. For example, such a system is used to advantage in a 250 mHz. spectrometer employing a superconducting solenoid to provide a scanned magnetic field at approximately 60 kg. and homogeneous to two parts in $10^9$.

Heretofore, gyromagnetic resonance spectrometers have been built using a superconducting solenoid to provide an intense uniform magnetic field. Typically, the field produced by the solenoid is not uniform (homogeneous) to the desired degree and therefore field correction coil sets have been employed to homogenize the magnetic field. These coil sets have had certain preferred geometries and circuit connections to produce independent field corrections such that correction of one gradient does not interfere with a previously obtained correction using another set of coils. In some types of spectrometers it is desirable to scan the magnetic field of the magnet over a certain range. In these systems a separate coil set has been provided through which current is passed to superimpose a uniform scan field component upon the main uniform magnetic field component, whereby the composite uniform field is scanned over a range of values about a nominal field intensity.

However, it has been discovered that the scan component may not have the desired degree of uniformity. Thus, field correction for the scan field component is desirable. A separate set of scan field correction coils could be provided but typically space for such a set of coils is limited. Alternatively, the main field correction coils could be used to correct for the scan field inhomogeneities but such coils would have to be separately adjusted for each successive value of scan field intensity.

In the present invention, a current proportional to the field scan current is fed into and superimposed upon the current in certain ones of the main field correction coils to automatically correct for the scan field inhomogeneities over wide scan ranges. Thus, scan field correction is obtained without the necessity of providing separate scan field correction coils or of separately adjusting the main field correction coils for each value of scan field intensity.

The principal object of the present invention is the provision of improved magnetic field homogeneity control for scanned magnetic fields.

One feature of the present invention is the provision of means for superimposing on the current of certain ones of the main field correction coils a current proportional to the magnet scan or offset current of a separate scan or offset coil, whereby the scan or offset field homogeneity is corrected without the necessity of providing separate field correction coils.

Figure 2:
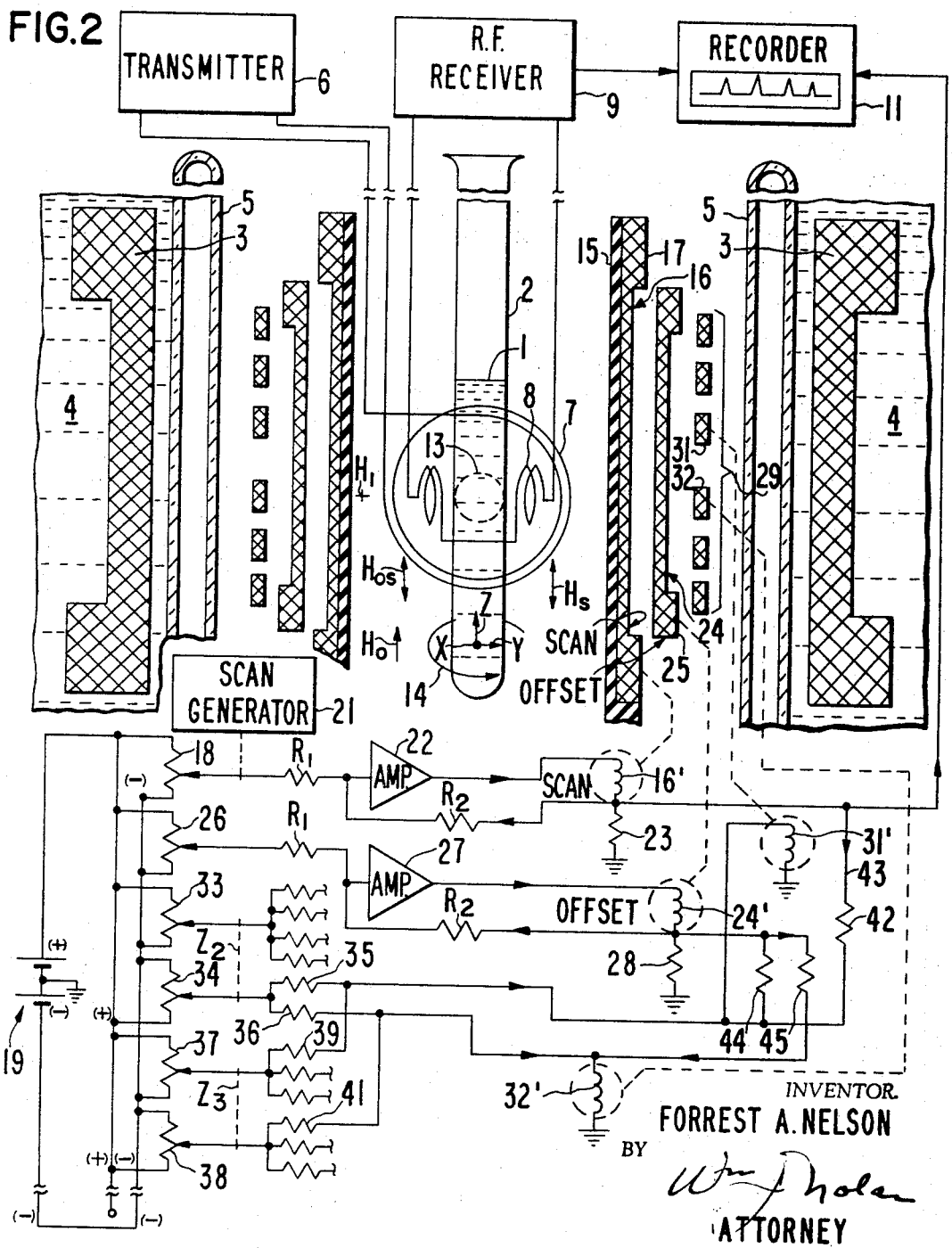

Other features and advantages of the present invention will become apparent upon a perusal of the following specification taken in connection with the accompanying drawings wherein:

FIG. 1 is a pair of spectral traces of gyromagnetic resonance, trace (a) being produced by a uniform scan field and trace (b) by a non-uniform scanned field, and FIG. 2 is a schematic diagram, partly in section and partly in block diagram form, of a gyromagnetic resonance spectrometer employing features of the present invention.

Referring now to FIG. 1, there is shown in trace (a) a typical gyromagnetic resonance spectrum obtained when scanning the D.C. magnetic field $H_o$ of the spectrometer with a homogeneous (uniform) scan field component $H_s$. Note that the resonance peaks have the same resolution at both ends of the spectrum. However, when the scan field component $H_s$ is not uniform, i.e., introduces magnetic field inhomogeneities (gradients), the resolution of the spectrum is destroyed at the end of the spectrum where the nonuniform scan component $H_s$ has its greatest amplitude. Such a spectrum is shown in trace (b) of FIG. 1. In the present invention, the non-uniformity of the scan field $H_s$ is corrected by feeding a current having an amplitude proportional to the scan current through certain ones of the main magnet's field correction coils to cancel out the scan field inhomogeneities (gradients) to produce a spectrum trace as shown in trace (a) of FIG. 1.

Referring now to FIG. 2, there is shown a representative gyromagnetic resonance spectrometer system employing features of the present invention. More particularly, a sample substance 1 to be analyzed and containing gyromagnetic resonance bodies, such as protons, is contained within a thin walled hollow cylindrical glass vial 2 and immersed in the intense region of D.C. magnetic field $H_o$ as of 60 kg. produced in the center of a cylindrical superconducting solenoid 3 (magnet). The solenoid 3 is contained within a hollow cylindrical liquid helium filled chamber 4 of a Dewar 5, the outside walls of which are not shown.

A radio frequency transmitter 6 at, for example, 250 mHz. supplies an A.C. magnetic field $H_1$ at 250 mHz. to the sample 1 via coil 7 and at right angles to the direction of the polarizing magnetic field $H_o$. The R.F. magnetic field $H_1$ excites gyromagnetic resonance of the gyromagnetic bodies of the sample 1.

Gyromagnetic resonance at the Larmor frequency of the bodies is picked up by a receiver coil 8 and fed to a radio frequency receiver 9. The receiver 9 detects the resonance signal and produces a D.C. output signal which is fed to a recorder 11. The recorder 11 records the resonance as a function of time or preferably as a function of magnetic field H which is scanned through successive resonance lines of the sample 1 to produce a recorded resonance spectrum. The scan circuit and field correction will be more fully described below.

The main solenoid magnet 3, although wound to the highest precision, will not produce a magnetic field over the region 13 of the sample 1 wherein resonance is detected of the requisite homogeneity, i.e., a few parts in $10^9$. Therefore, a spinner, not shown, is coupled to the vial 2 for spinning it about an axis, Z axis, parallel to the D.C. field, as indicated by the arrow 14, at a suitable rate such as 3,000 r.p.m. Spinning the sample 1 averages out magnetic field gradients having components transverse to the spinning axis, i.e., X and Y components. If certain of these transverse gradients are of large amplitude they will produce large spinning sideband components in the resonance spectrum. Accordingly, certain ones of the transverse field gradients are canceled by gradient canceling coils, not shown, wound on a dielectric cylindrical coil form 15. The coil form 15 is, for example, 3.875" long and 0.700" O.D. with a retaining lip at one end. The coil form 15 is axially centered over the resonance sample region 13.

A magnetic field scan coil 16 as of #34 Formvar wire is wound over the transverse gradient coils, not shown. The scan coil 16 comprises, for example, 292 turns with a pair of 30 turn end corrective portions 17. The coil 16 has an overall length of 2.200" and a center O.D. of 0.869". The scan coil 16 produces a uniform axially directed magnetic field component H$s$ which is superimposed upon the main polarizing magnetic field component H$o$ of the solenoid magnet 3 to vary the total polarizing magnetic field to produce a resonance spectrum output.

The scan coil 16 is connected in a circuit as indicated by the dashed lead line to the circled coil 16'. Current for the scan coil 16' is derived from a potentiometer 18 connected across the terminals of a grounded center-tapped battery 19. A scan generator 21 drives the pickoff of the potentiometer 18 and the voltage picked off is fed to a very high gain, as of 10,000, operational amplifier 22 wherein it is amplified. The output of the amplifier is fed to the scan coil 16' and thence to ground via a resistor 23 as of 100Ω. A scan voltage, derived across the resistor 23, is fed to one terminal of the recorder 11 for recording as a function of the resonance signal amplitude to yield a resonance spectrum. This scan output voltage is also fed back to the input of the operational amplifier 22 in phase opposition to the input voltage such that the input voltage as dropped across an input resistor $R_1$, as of 10KΩ, to ground is equal and opposite to the output scan voltage dropped across a feedback resistor $R_2$ as of 10KΩ. In this manner, the output current of amplifier 22 is proportional to the input voltage derived from the potentiometer 18.

A field offset solenoid coil 24 as of #34 Formvar wire is wound over the field scan coil 16. The offset coil comprises, for example, 222 turns with a pair of end corrective portions 25 of 26 turns each. The coil 24 has a length of 1.7" and a center section O.D. of 0.897". The offset coil 24 serves to produce an axially directed uniform magnetic field component H$os$ which is added to the D.C. polarizing magnetic field components H$o$ and H$s$ produced by the magnet 3 and scan coil 16 to produce the total polarizing magnetic field. The offset coil 24 is used to establish a total uniform polarizing magnetic field intensity about which the field is scanned by the scan coil 16. Although a separate offset coil 24 is shown, an alternative embodiment would have the scan coil 16 used to provide both the scan and offset field components.

The offset coil 24 is energized in a similar manner to that described for the scan coil 16. A dashed lead line interconnects the offset coil 24 and the offset coil 24' as it is connected in its energizing circuit. Current for the offset coil 24' is derived from a potentiometer 26 connected across the terminals of the grounded centertapped battery 19. The offset voltage picked off the potentiometer 26 is fed to an operational amplifier 27 wherein it is amplified and fed to the offset coil 24' and thence to ground via a resistor 28 as of 100Ω. The output offset voltage as derived across resistor 28 is fed back in phase opposition to the input voltage to the operational amplifier 27. Resistors $R_1$ and $R_2$ compare the voltages to ground. The error voltage serves as the input to amplifier 27.

A set of six gradient canceling coils 29 are wound over the center portion of the offset coil 24. The gradient coils 29 are coaxial with the main magnet solenoid 3. The coils are energizeable, either separately or in certain combinations, with currents derived from the battery 19 to cancel certain gradients of the main magnet solenoid 3. The gradients so canceled are those which have components parallel to the sample spinning axis Z and thus are not averaged out by spinning.

The 6 gradient coils 29 each comprise 25 turns of #34 Formvar wire wound with an outside diameter of 0.911" in an array 1.110" long with the 3 coils 29 at one end separated, at the center point, from the 3 coils 29 at the other end by 0.030". The coils 29 are wound with no space between adjacent coils in each set of three coils 29. The coils 29 each has a resistance of 2.7Ω.

Each and every circuit for energizing the coils 29 in all their respective combinations is not shown. The complete array of corrective circuits is complex and a similar array is described and claimed in copending U.S. application 442,000, filed Mar. 23, 1965, and assigned to the same assignee as the present invention. Only those gradient canceling coil circuits which include a gradient coil 29 in common with the field scan coil 16 or offset coil 24 are shown in detail.

More particularly, second order gradients $Z_2$ along the Z axis are canceled by energizing the outer two pairs of coils of the coil set 29 in magnetic field aiding relation and energizing the inner pair of coils 31 and 32 in magnetic bucking relation to the outer coils, whereby a second order curvature of the magnetic field is produced over the detected resonance region 13 of the sample 1.

The currents for the second order correction are derived from a pair of ganged potentiometers 33 and 34. The inner pair of coils 31' and 32' is energized from the opposed current potentiometer 34 via resistors 35 and 36 as of 53.6Ω each.

The third order gradient correction along the Z axis, $Z_3$, is obtained by energizing the first, second and fourth coils 29 in magnetic field opposition to the second, fifth and sixth coils 29. The opposed currents are derived from a pair of ganged potentiometers 37 and 38. Currents in the inner pair of coils 31 and 32 are opposed and derived from the potentiometers 37 and 38 via resistors 39 and 41, respectively, as of 49.9Ω each. The currents for the third order gradient correction $Z_3$ are superimposed upon the currents for the second order gradient correction $Z_2$.

The magnetic field gradients in the field H$o$ of the main magnet 3 are independently canceled by separately adjusting the ganged potentiometers $Z_2$, $Z_3$ and $Z_1$, the latter not shown, for optimum resolution of the output resonance spectra. The controls for these gradient corrections are orthogonal in the sense that optimum adjustment of one set does not disturb a previously optimized setting of another control.

Although the scan solenoid 16 and offset solenoid 24 are wound to a high degree of precision, it was found that their field components introduced gradients into the total polarizing magnetic field. In particular, it was found that the scan solenoid 16 introduced a first order Z gradient $Z_1$ which was corrected by feeding a portion of the scan current, as derived across resistor 23, into coil 31 of the main solenoid magnet correction coils 29. A series resistor 42 as of 1600Ω was placed in series with a lead 43 interconnecting the scan coil 16 and the correction coil 31 for reducing the scan correction current to about 1/15 that of the scan current.

The field offset coil 24 was found to produce both a first order Z gradient $Z_1$ and a second order Z gradient $Z_2$. These gradients were corrected by feeding certain fractions of the offset current, as derived across resistor 28, into coils 31 and 32 of the main magnet correction coils 29. A first correction was made by connecting a resistor 44 as of 490Ω between the offset coil 24' and the coil 31'. A second correction was made by connecting a resistor 45 as of 500Ω between the offset coil 24' and the correction coil 32'. The aiding currents in coils 31' and 32' produced the second order $Z_2$ gradient or curvature correction whereas the differential currents produced by the 10Ω differential resistance of resistors 44 and 45 provided the first order Z gradient correction $Z_1$.

The scan, offset, and correction coils 14, 24 and 29, shown in exploded view, are wound together and are potted in a suitable dielectric potting compound as of epoxy to form a solid unit.

The superconducting solenoid magnet, as above described, gave a total uniform field of 60 kg. The field was offset in 0.25 g. steps over a range of 2 g., and scanned between offset steps. The total magnetic field had a uniformity, as scanned and offset, to two parts in $10^9$.

Although the scan and offset field homogeneity corrections were described as employed with solenoid shaped magnet and coils, these corrections are equally applicable to iron core electromagnets having field gaps defined between pairs of parallel pole faces. Such electromagnet systems are more fully described in the aforecited copending application 442,000.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnet apparatus including, first magnet means for producing a uniform D.C. magnetic field component with associated minute gradient components in a region of space, means forming a gradient coil structure to produce a gradient magnetic field component of variable magnitude superimposed upon the field in the region of the uniform magnetic field component produced by said first magnet means for canceling a certain one of the associated magnetic field gradients in the D.C. magnetic field produced by said first means, second uniform field producing coil means separate from said first magnet means for producing a second uniform magnetic field component with associated minute gradient components superimposed upon the first uniform magnetic field component for varying the total uniform magnetic field intensity, and means for deriving and superimposing a current proportional to the current in said second uniform field producing coil means on the current of said gradient coil structure to cancel a certain gradient produced by said second uniform field producing coil means, whereby said common gradient coil structure serves to correct the gradients associated with both said first and second uniform magnetic field components.

2. The apparatus of claim 1 wherein said second uniform field producing coil means is a solenoid coaxially disposed of the uniform magnetic field region produced by said first magnet means.

3. The apparatus of claim 2 wherein said common gradient producing coil structure is a coil coaxially wound with respect to said solenoid which produces the second uniform magnetic field component.

4. The apparatus of claim 3 wherein said first magnet means is a superconducting solenoid coaxially wound of said solenoid which produces the second uniform magnetic field component.

5. The apparatus of claim 1 including in combination, means for immersing a gyromagnetic resonance substance under analysis in the uniform magnetic field region produced by said first magnet means, means for exciting and detecting gyromagnetic resonance of the substance, and means for scanning the total uniform magnetic field by passing a scanned current intensity through said second uniform field producing coil means to produce a resonance spectrum of the substance under analysis.

References Cited
UNITED STATES PATENTS

| | | | |
|---|---|---|---|
| 3,199,021 | 8/1965 | Anderson | 324—0.5 |
| 3,287,630 | 11/1966 | Gang | 324—0.5 |
| 3,336,526 | 8/1967 | Weaver | 324—0.5 |

RUDOLPH V. ROLINEC, *Primary Examiner.*

M. J. LYNCH, *Assistant Examiner.*